United States Patent
Smith et al.

(10) Patent No.: US 7,219,137 B1
(45) Date of Patent: May 15, 2007

(54) TECHNICIAN WIRELINE AND WIRELESS INTRANET ACCESS VIA SYSTEMS INTERFACE TO LEGACY SYSTEMS

(75) Inventors: Steven G. Smith, Roswell, GA (US); Gary J. Dennis, Duluth, GA (US); Ralph J. Mills, Atlanta, GA (US); Roland T. Morton, Jr., Atlanta, GA (US); Curt Kaloustian, Marietta, GA (US); Jeffrey A. Sylvester, Dallas, GA (US); Mitchell E. Davis, Palmetto, GA (US)

(73) Assignee: BellSouth Intellectual Property Corp, Wilmington, DE (US)

( * ) Notice: Subject to any disclaimer, the term of this patent is extended or adjusted under 35 U.S.C. 154(b) by 727 days.

(21) Appl. No.: 09/892,663

(22) Filed: Jun. 28, 2001

(51) Int. Cl.
*G06F 15/16* (2006.01)

(52) U.S. Cl. .................. 709/219; 709/217; 709/220; 709/227

(58) Field of Classification Search ............... 709/225, 709/246, 219, 217, 218; 707/10
See application file for complete search history.

(56) References Cited

U.S. PATENT DOCUMENTS

| | | |
|---|---|---|
| 4,776,016 A | 10/1988 | Hanson |
| 4,905,163 A | 2/1990 | Garber et al. |

(Continued)

FOREIGN PATENT DOCUMENTS

| | | |
|---|---|---|
| EP | 0 712 227 | 5/1996 |

(Continued)

OTHER PUBLICATIONS

Commercial Speech Recognition (www.tiac.net/users/rwilcox/speech.html), Apr. 17, 2001.

(Continued)

*Primary Examiner*—Bunjob Jaroenchonwanit
*Assistant Examiner*—Dohm Chankong
(74) *Attorney, Agent, or Firm*—Withers & Keys, LLC (57) ABSTRACT

Methods and systems are disclosed for a user to access an intranet from within a systems interface to back-end legacy systems. A user logs a computer into a systems interface which permits access to back-end legacy systems. The computer accesses the systems interface over a wireline or a wireless communications network. Preferably, the systems interface is located on at least a first network address. Preferably, the systems interface includes a first server with middleware for managing the protocol interface, the first server being located at the first network address. Preferably, the systems interface includes a second server for receiving requests and generating legacy transactions. When the user is logged on, a client application for the systems interface is running on the computer. Next, the user launches a shared network software application, preferably a browser. The user may or may not minimize the client application, but the user remains logged-on. As the browser launches and seeks out an intranet site at a separate network address, the systems interface receives a message from the computer or otherwise detects that the computer is seeking access to the intranet. In response to detecting that the computer seeks access to the internet, the systems interface determines whether intranet access is to be granted. If access is granted, the systems interface routes communications from the computer to the separate network address. Preferably, the first server routes communications from the computer from the first network address to the separate network address.

19 Claims, 4 Drawing Sheets

U.S. PATENT DOCUMENTS

| | | | |
|---|---|---|---|
| 5,038,283 A | 8/1991 | Cavenay | |
| 5,359,649 A | 10/1994 | Rosu et al. | |
| 5,521,958 A | 5/1996 | Selig et al. | |
| 5,570,283 A | 10/1996 | Shoolery et al. | |
| 5,583,937 A | 12/1996 | Ullrich | |
| 5,623,404 A | 4/1997 | Collins et al. | |
| 5,664,110 A | 9/1997 | Green et al. | |
| 5,687,212 A | 11/1997 | Kinser, Jr. et al. | |
| 5,694,323 A | 12/1997 | Koropitzer et al. | |
| 5,696,906 A | 12/1997 | Peters | |
| 5,754,830 A * | 5/1998 | Butts et al. | 719/311 |
| 5,799,279 A | 8/1998 | Gould | |
| 5,805,775 A | 9/1998 | Eberman | |
| 5,812,977 A | 9/1998 | Douglas | |
| 5,826,270 A | 10/1998 | Rutkowski | |
| 5,848,403 A | 12/1998 | Gabriner et al. | |
| 5,857,201 A | 1/1999 | Wright et al. | |
| 5,873,070 A | 2/1999 | Bunte | |
| 5,884,262 A | 3/1999 | Wise | |
| 5,896,440 A | 4/1999 | Reed et al. | |
| 5,909,492 A | 6/1999 | Payne | |
| 5,920,846 A | 7/1999 | Storch et al. | |
| 5,923,735 A | 7/1999 | Swartz et al. | |
| 5,931,917 A | 8/1999 | Nguyen et al. | |
| 5,953,389 A | 9/1999 | Pruett | |
| 5,960,411 A | 9/1999 | Hartman et al. | |
| 5,963,940 A | 10/1999 | Liddy | |
| 5,970,472 A | 10/1999 | Allsop | |
| 5,974,135 A * | 10/1999 | Breneman et al. | 379/265.04 |
| 6,023,683 A | 2/2000 | Johnson et al. | |
| 6,023,684 A | 2/2000 | Pearson | |
| 6,026,379 A | 2/2000 | Haller et al. | |
| 6,035,285 A | 3/2000 | Schlect | |
| 6,052,785 A * | 4/2000 | Lin et al. | 713/201 |
| 6,058,373 A | 5/2000 | Blinn | |
| 6,080,202 A | 6/2000 | Strickland | |
| 6,081,789 A | 6/2000 | Purcell et al. | |
| 6,092,192 A | 7/2000 | Kanevsky | |
| 6,101,472 A | 8/2000 | Giangarrea et al. | |
| 6,115,040 A | 9/2000 | Bladow | |
| 6,115,737 A | 9/2000 | Ely | |
| 6,223,541 B1 * | 5/2001 | Farrag | 62/62 |
| 6,226,623 B1 | 5/2001 | Schein | |
| 6,233,541 B1 | 5/2001 | Butts et al. | |
| 6,311,178 B1 | 10/2001 | Bi | |
| 6,324,522 B2 | 11/2001 | Petersen et al. | |
| 6,341,271 B1 | 1/2002 | Salvo et al. | |
| 6,366,829 B1 | 4/2002 | Wallace et al. | |
| 6,389,337 B1 | 5/2002 | Kolls et al. | |
| 6,445,774 B1 | 9/2002 | Kidder | |
| 6,473,407 B1 | 10/2002 | Ditmer | |
| 6,487,278 B1 | 11/2002 | Skladman | |
| 6,539,548 B1 | 3/2003 | Hendricks | |
| 6,578,005 B1 | 6/2003 | Lesaint et al. | |
| 6,598,167 B2 * | 7/2003 | Devine et al. | 713/201 |
| 6,636,831 B1 * | 10/2003 | Profit et al. | 704/275 |
| 6,671,824 B1 | 12/2003 | Hyland | |
| 6,736,376 B1 | 5/2004 | Delisle | |
| 6,738,815 B1 * | 5/2004 | Willis et al. | 709/225 |
| 6,763,376 B1 * | 7/2004 | Devine et al. | 709/223 |
| 2001/0016819 A1 | 8/2001 | Kolls | |
| 2002/0099642 A1 | 7/2002 | Schwankl | |
| 2002/0103906 A1 * | 8/2002 | Knight et al. | 709/225 |
| 2002/0138656 A1 | 9/2002 | Hickey | |
| 2003/0023601 A1 * | 1/2003 | Fortier et al. | 707/10 |
| 2003/0125956 A1 | 7/2003 | Lewis | |

FOREIGN PATENT DOCUMENTS

| | | |
|---|---|---|
| EP | 0732850 | 9/1996 |

OTHER PUBLICATIONS

IBM Voice System (www-4.ibm.com/software/speech), Apr. 17, 2001.

IBM Voice Systems (www-4.ibm.com/software/speech/enterprise), Apr. 17, 2001.

IBM Voice Systems (www-4.ibm.com/software/speech/enterprise/ms_0.html), Apr. 17, 2001.

Metroplex Voice Computing, Inc. (www.metroplexvoice.com), Apr. 17, 2001.

Metroplex Voice Computing, Inc. (www.metroplexvoice.com/toc.htm), Apr. 17, 2001.

Metroplex Voice Computing, Inc. (www.metroplexvoice.com/news.htm), Apr. 17, 2001.

Metroplex Voice Computing, Inc. (www.metroplexvoice.com/products.htm), Apr. 17, 2001.

Metroplex Voice Computing, Inc. (www.metroplexvoice.com/medical_speech_recognition.htm), Apr. 17, 2001.

Voice Recognition Systems Home Page (www.iglou.com/vrsky/rightframe.htm), Apr. 17, 2001.

Lernout & Hauspie (www.lhsl.com/default2.htm), Apr. 17, 2001.

Lernout & Hauspie, "The Language of Business" (www.lhsl.com/business), Apr. 17, 2001.

Lernout & Hauspie, "Voice Xpress" (www.lhsl.com/voicexpress), Apr. 17, 2001.

TMA Associates (www.tmaa.com), Apr. 17, 2001.

TMA Associates, Editor's Notes (May 2000) (www.tmaa.com/voice_web.htm), Apr. 17, 2001.

Fonix (www.fonix.com), Apr. 17, 2001.

Dragon Systems Inc.: Dragon Naturally Speaking Preferred Edition (www.zdnet.com/pcmag/features/speech/rev1.html), Apr. 17, 2001.

Nuance Verifier 2.0 (www.nuancecom.com/products/verifier.html), Apr. 19, 2001.

Nuance Vocalizer (www.nuancecom.com/products/vocalizer.html), Apr. 19, 2001.

Nuance 7.0 (www.nuancecom.com/products/nuance7.html), Apr. 19, 2001.

Nuance (www.nuancecom.com), Apr. 19, 2001.

Nuance Powers the Voice Web (www.nuancecom.com/partners/voiceweb.html), Apr. 19, 2001.

Nuance Product Offering (www.nuancecom.com/products/products.html), Apr. 19, 2001.

Nuance Voyager (www.nuancecom.com/products/voyager.html), Apr. 19, 2001.

Nuance Solutions (www.nuancecom.com/solutions/solutions.html), Apr. 19, 2001.

Nuance Enterprise Solutions (www.nuancecom.com/solutions/enterprise.html), Apr. 19, 2001.

Nuance Telecom Solutions (www.nuancecom.com/solutions/telecom.html), Apr. 19, 2001.

Nuance Internet Solutions (www.nuancecom.com/solutions/internet.html), Apr. 19, 2001.

Nuance Services (www.nuancecom.com/services/services.html), Apr. 19, 2001.

Nuance Speech Application Design and Development (www.nuancecom.com/services/speech_application_design.html), Apr. 19, 2001.

Delivering Speech Technologies with the Fonix FAAST® Framework, Part I (a white paper), Feb. 2001.

No author; FieldCentrix Selects BellSouth's Intelligent Wireless Network to Bring Wireless Data Solution to Field Service Companies, Aug. 24, 1999; BusinessWire; Dialog copy pp. 1-2.

Moran et al.; "Multimodal User Interfaces in the Open Agent Architecture", Proceedings of the 2nd International Conference on Intelligent User Interfaces, Aug. 1996.

Conversay "Speech Technology Solutions", White Paper C 2001.

Derfler,Frank J et al, "How Networks Work", Millennium ed. , Que Corp. Jan. 2000.

White, Ron, "How Computers Work", Millennium ed., Que Corp. Sep. 1999.

Gralla, Preston, "How the Internet Works", Millennium ed., Que Corp., Aug. 1999.

"Return on Investment Model", web.archive.org webpage of Norand.com, Feb. 6, 1998, pp. 1-5.

"Norand-Payback", web.archive.org webpage of Norand.com, Feb. 6, 1998, pp. 1-2.

"Norand-Products", web.archive.org webpage of Norand.com, Feb. 6, 1998, pp. 1-5.

"Norand-Case Study", web.archive.org webpage of Norand.com, Feb. 1998, pp. 1-3.

Haugen, Dyan L.; Hill, Arthur V; "Scheduling to Improve Field Service Quality", Summer 1999, Decision Sciences, 30, 3: ABI/INFORM Global, pp. 783-804.

Freedman, David H; "Case Study: Gas Attack", Aug. 25, 1997, Forbes ASAP Supplement, pp. 45-52, Dialog 01485548 01-36536.

McCarthy, Vince, "The Transformation of the Public Network", Mar. 20, 1995, Telephone, v228n12, pp. 88-100, Dialong 0100552196-54914.

Paz, Noemi M; Leigh, William; "Maintenance scheduling: Issues, results and research needs", 1994, International Journal of Operations & Production Management, v14n8, pp. 47-69, Dialog 00956565 96-05958.

Tseng, Paul C; Lewis, Malcom; "Best Practices and Design Tips", Apr. 1999, Contracting Business, v56, n4, p2s84(1), Dialog 06305741 54514903.

Jewett, Dale,; "Service Call", Jul. 21, 1997, Automotive News, p. 61, Dialog 05140584 47847132.

Southerland, Randy; "Not your typical garbagemon", Feb. 2000, Waste Age, 31, 2, ss50, Dialog 11970477.

"The Luxury Class Database", Apr. 3, 1995, InformationWeek, n 521, p. 100+, Dialong 00593604 23168942.

Ivey, Mike; "Cub: Toughen Penalties vs. Ameritech", Sep. 7, 2000, Madison Captial Times, Madison, Wisconsin, p. 1E, ProQuest ID 59714682.

Jaffe, Charles; "Gas Supplier takes timing seriously if delivers are late, the product is free". Feb. 5, 1989. The Morning Call, Allentown, PA, p. D.01. ProQuest ID 92485879.

Lister, Karen; "Improvements cited in Portland cable service", Jul. 21, 1995, Corpus Christi Caller Times, Corpus Christi, TX., Sec. B, p. 2, ProQuest 6892257.

"Norand-Field Service", web.archive.org webpage of Norand.com., Feb. 6, 1998, pp. 1-2.

"Norand-Training", web.archive.org webpage of Norand.com., Feb. 6, 1998, pp. 1-2.

Wood, Michael; "Fighting the paperwork nemesis", Mar. 1996, American Gas, v78n2, pp. 32-33, Dialog 01179245 98-28640.

"Powering better customer service. (Boston Edison implements mobile computing solution)", May 1997, Communication News, v34, 5n, p. 50(2) Dialog 02070908 19414033.

Kosseff, Jeffrey; "Service Delays May Lead to AT&T Fine", Jul. 18, 2001, The Oregonian, Portland, OR., p. C.01. ProQuest ID 75527844.

* cited by examiner

TECHNICIAN WIRELINE AND WIRELESS INTRANET ACCESS VIA SYSTEMS INTERFACE TO LEGACY SYSTEMS

FIELD OF THE INVENTION

The present invention relates generally to the field of telecommunications dispatching and, more particularly, to methods and apparatus for providing mobile personnel access to a company shared network.

BACKGROUND OF THE INVENTION

Telecommunications technicians, such as so-called "Installation and Maintenance" (I&M) technicians, may visit customer sites to install new equipment, set up new services, or to service existing equipment or services. Frequently an I&M technician needs to gather local or district-specific information to complete a "job order" or task. For example, an I&M technician may need to know cross-box locations, pricing information, service information, cable records, plat information, or other information needed to carry out his or her assignment.

For many telephone companies, including Regional Bell Operating Companies (RBOCs), such local information is generally not stored on centralized legacy systems. Accordingly, although I&M technicians can presently access information stored on these central legacy systems using portable laptops and custom software, they are unable to remotely access the local information using their portable laptops.

According to the conventional approach to this problem, an I&M technician seeking local information must make one or more telephone calls to local offices of his or her employer. Several calls may be required. The I&M technician may be put on hold as the call attendant collects the information or tends to other business. The time the I&M technician must spend in collecting local information reduces his or her job efficiency and may increase costs to customers. Furthermore, miscommunications between individuals may cause incorrect information to be transferred. For example, the data retrieved by the call attendant may not be accurately interpreted by the call attendant who has a lower level of technical expertise then the I&M technician. These are significant drawbacks to the current approach.

SUMMARY OF THE INVENTION

The present invention is generally directed to a system and method for permitting a user to access local information stored on a company shared network or an intranet. In the present invention, a user logs a computer into a systems interface which permits access to back-end legacy systems. The computer accesses the systems interface over a wireline or a wireless communications network. Preferably, the systems interface is located at or associated with at least one network address.

Preferably, the systems interface includes a first server with middleware for managing the protocol interface, and the first server is located at or associated with a first network address. Preferably, the systems interface includes a second server for receiving requests and generating legacy transactions. When the user is logged in, a client application for the systems interface is running on the computer.

Next, the user launches a shared network software application, preferably a browser. The user may or may not minimize the client application, but the user remains logged in. As the browser launches and seeks out an intranet site at a separate network address, the systems interface receives a message from the computer or otherwise detects that the computer is seeking access to the intranet. The user can manually enter, or through a previous bookmarking procedure, provide, the network address of the desired "target" web page. When this network address is received, access to the Intranet begins.

In response to detecting that the computer seeks access to the intranet, the systems interface determines whether intranet access is to be granted. If access is granted, the systems interface routes communications from the computer to the separate network address. The middleware passes the session (the requested data transaction) on to the network address that is input with TechNet, and the network address of the TechNet server is transmitted. Other network addresses sent by the browser are passed by the middleware. Preferably, the first server routes the computer from the first network address to the separate network address. The user is then logged into an operations support systems (OSS), and connectivity to the OSS is maintained while access to Intranet is being accomplished.

The advantages of the present invention are numerous. The invention permits a technician to remotely access local or district-specific information without making a series of telephone calls to local offices. The initial log-on to the systems interface provides a measure of security, yet a separate log-on to the intranet is not required. When accessing the intranet, the computer remains logged on to the systems interface so that a return to the systems interface, for example, to access the legacy systems, is readily achieved. For example, in addition to overcoming the limitations described above, the present invention makes available information that is otherwise inaccessible to the technician. Furthermore, the technician can also provide direct input to intranet accessed systems, databases, and information repositories.

DETAILED DESCRIPTION OF THE INVENTION

Figure 1:
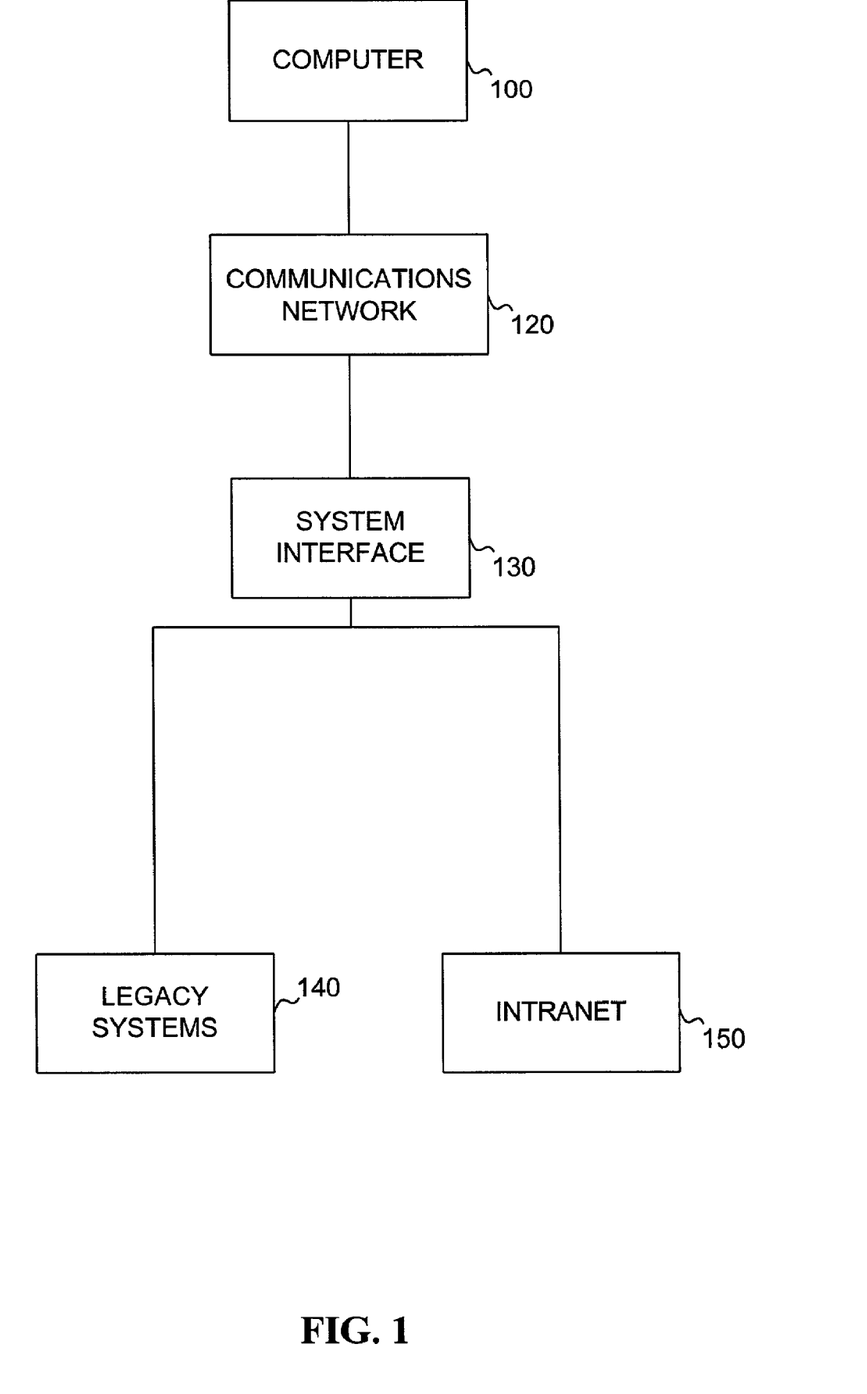
FIG. 1 is a schematic block diagram of a system for allowing user access to an intranet according to one embodiment of the invention.

FIG. 1 is a schematic block diagram of an exemplary system for allowing a user, such as a technician, to access an intranet according to one embodiment of the invention. The system of FIG. 1 includes computer 100, communications network 120, systems interface 130, back-end legacy systems 140, and intranet 150.

Computer 100 is a computer used by a technician or other service person to access information from back-end legacy systems 140. As used herein, "computer" is used in the broadest sense of the term. A "computer" may be a microcomputer, minicomputer, laptop, personal data assistant, cellular phone, two-way pager, processor, or any computerized device capable of transmitting and receiving data over a shared network. Preferably, computer 100 is a ruggedized laptop computer.

Computer 100 remotely accesses systems interface 130 through communications network 120. Communications network 120 may be any communications network that permits a remote computer to access a remote server. Communications network 120 could be a wireline network, wireless or cellular network, satellite network, or other network permitting a computer to communicate with a remote server. Preferably, communications network 120 is a Public Switched Telephone Network (PSTN). For example, communications network 120 can be BellSouth Communications Network. Alternatively communications network 120 can be a wireless network, such as the Cingular Wireless Network.

Systems interface 130 provides a systems interface between remote (and preferably portable) computers 100 seeking data from back-end legacy systems 140. Legacy systems 140 are generally mainframe-type computer systems that maintain data for a company. According to an embodiment, legacy systems 140 may include one or more legacy systems including a loop facility assignment control system; a loop maintenance operations system; a computer system for main frame operations; a mechanized loop testing system; a secure network element contract server; a mechanized time reporting system; and a work activity statistical sampling plan system.

Intranet 150 is a company shared network that includes local information not generally stored or maintained on legacy systems 140. Generally, intranet 150 includes firewalls or similar protections to prevent tampering or intrusion by unauthorized users. Prior to the present invention, intranet 150 was generally inaccessible to technicians operating a computer 100 logged-in to the systems interface 130 to legacy systems 140. As used herein, "company" is intended to have the broadest meaning, and should be understood to include a company, corporation, association, partnership, limited liability company, and any other group of persons or entities that may store and share data via a shared intranet. Preferably, intranet 150 is an intranet for a telecommunications entity that stores local or district-specific information not generally stored in centralized back-end legacy systems. According to another embodiment, intranet 150 may be or may include an external computer network, for example, the Internet.

The general operation of the system of FIG. 1 is as follows. A technician with computer 100 logs onto systems interface 130 over communications network 120. After the log-on, systems interface 130 permits computer 100 to submit requests for information. Systems interface 130 processes these requests, generates legacy transactions, receives information from legacy systems 140, and transmits the information back to computer 100. Systems interface 130 is also adapted to allow a user to access intranet 150. If the user is permitted access to intranet 150, computer 100 is routed from systems interface 130 to intranet 150.

Figure 2:
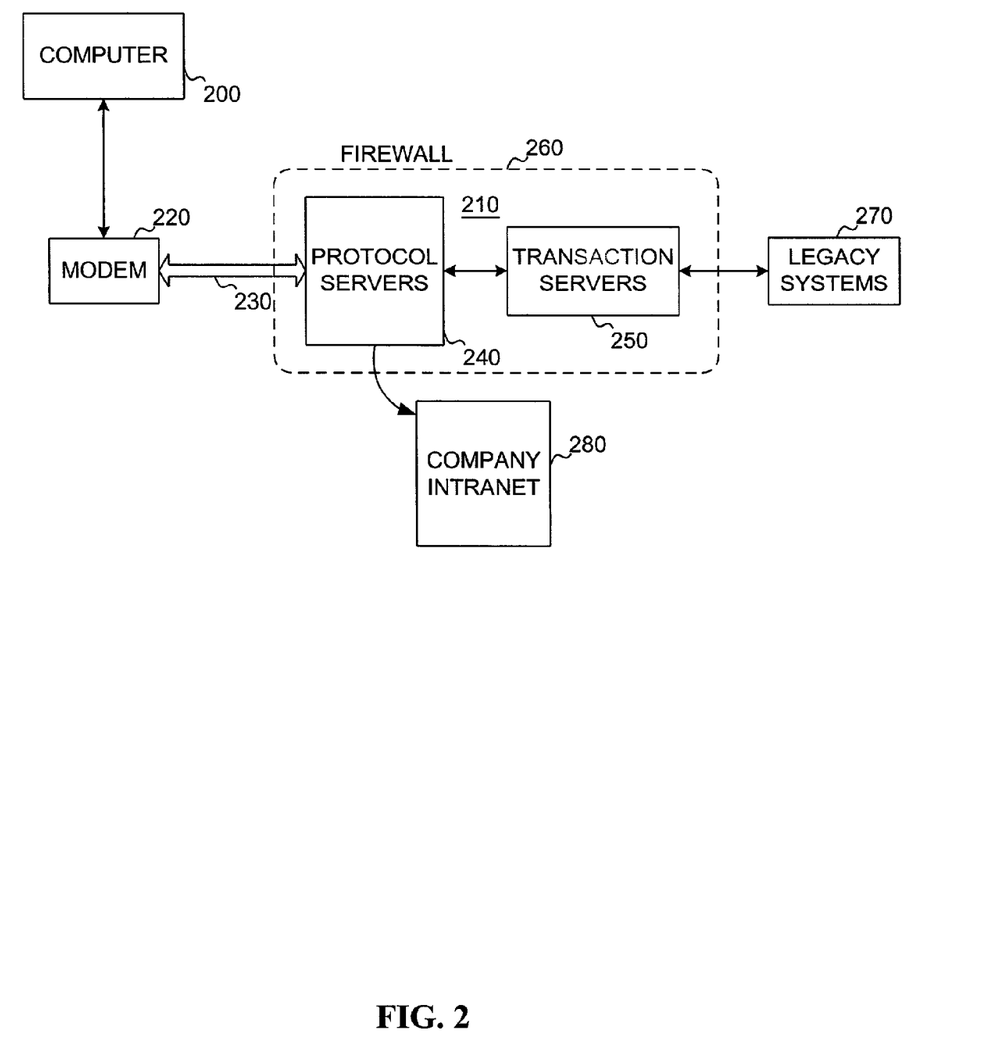
FIG. 2 is a schematic block diagram of a system for allowing user access to an intranet according to another embodiment of the invention.

FIG. 2 is a schematic block diagram of an exemplary preferred system for allowing technicians to access an intranet according to another embodiment of the invention. The system of FIG. 2 includes computer 200, modem 220, communications network 230, one or more protocol servers 240, one or more transaction servers 250, firewall 260, legacy systems 270, and company intranet 280.

Computer 200 is a remote and preferably portable computer (e.g., a ruggedized laptop or notebook computer) used by a technician. Computer 200 may be any of the devices discussed above for computer 100 (FIG. 1).

Modem 220 is a modem for coding and decoding data transmitted between computer 200 and communications network 230. Depending on whether communications network 230 is wireline or wireless, modem 220 may be a conventional wireline modem or a so-called "cellular modem" or "wireless modem". Preferably, a wireline modem can transmit at 56.6 kb/s or is a v.90 modem. A wireless modem can preferably transmit at about 2 kb/s.

Communications network 230 may be a wireline communications network. For example, communications network 230 can be a PSTN, such as the BellSouth Communications Network. Alternatively, or in addition, communications network 230 may be a wireless or cellular communications network. For example, communications network 230 can comprise the Cingular Wireless Network. Generally, modem 220 and communications network 230 can support transmission rates in the range of about 2 to 56 kilobits per second, depending on whether the communications link is wireline or wireless.

Legacy systems 270 and company intranet 280 are similar to and include any of the variations discussed in connection with legacy systems 140 and intranet 150, respectively, of FIG. 1.

According to FIG. 2, computer 200 accesses legacy systems 270 and company intranet 280 via a systems interface 210. Systems interface 210 can include protocol servers 240 and transaction servers 250. System interface 210 can be protected by firewall 260. Generally, protocol servers 240 provide a protocol and middleware interface between computer 200 and transaction servers 250. Protocol servers 240 may receive requests for information or other messages from computer 200; route requests or messages to input queues in transaction servers 250; receive responsive information from transaction servers 250; and route responsive information back to computer 200.

Generally, transaction servers 250 provide an interface to back-end legacy systems 270 so that responsive information can be retrieved. Transaction servers 250 may service requests, generate legacy transactions in response to those requests, and receive responsive information to be forwarded back to protocol servers 240.

In one specific implementation, protocol servers 240 may be NT servers running NetTech software from Broadbeam Corporation of Princeton, N.J. Transaction servers 250 may utilize Unix operating system software running an Informix database management system.

The preferred systems interface (which can be element 130 of FIG. 1 and element 210 of FIG. 2) is disclosed in the copending, commonly owned, U.S. patent application Ser. No. 09/343,815, entitled "Systems and Methods for Utilizing a Communications Network for Providing Mobile Users Access to Legacy Systems (hereinafter, referred to as "the '815 application"), filed on Jun. 30, 1999, the entirety of which is hereby incorporated by reference. The preferred systems interface is described in the aforementioned application in connection with the so-called "TECHNET" system, which includes protocol servers and TechNet servers corresponding to protocol servers 240 and transaction servers 250, respectively.

According to an embodiment, the "virtual location" (hereinafter, simply the "location") of systems interface 210 is defined by at least one network address. Preferably, the network address comprises an Internet Protocol (IP) address, which is well-known in the art. At least one network address defines the location of systems interface 210. Preferably, the location of protocol servers 240 is defined by a first network address and the location of transaction servers 250 is defined by a second network address.

The company intranet 280 has its own network address or addresses. Preferably, the network address defining the company intranet 280 is an IP address. The network address of company intranet 280 is referred to herein as a "separate network address" so as to indicate that company intranet 280 is located at a network address separate from the network address of systems interface 210.

The general operation of the preferred system of FIG. 2 is now described. A user (e.g., a technician) using computer 200 dials up or otherwise contacts protocol servers 240 via modem 220 and communications network 230. The user may dial up or otherwise contact protocol servers 240 over a communications network 230 that is a wireline network or that is a wireless network. The technician may log-on to the protocol servers 240 using a user name and other data, such as a password and/or primary host group address. Once the technician has been authenticated, a session (hereinafter, a "TechNet session") is established and computer 200 is connected to a protocol server 240 associated with the first network address.

Preferably, computer 200 is running application-specific client software for interfacing with the systems interface to legacy systems 270. According to an embodiment, computer 200 is running the TechNet client application disclosed in the '815 application.

Preferably, upon log-on a primary screen or primary graphical user interface (GUI) is transmitted to computer 200. This is referred to herein as the "TechNet home page." A technician may make selections from the TechNet home page to access data from back-end legacy systems 270. For example, the technician may select "Get A Job" to get his or her next task or job order. The information corresponding to the "Get A Job" request (i.e., a job order for that technician) is provided from legacy systems 270. Other requests for information from legacy systems 270 can be initiated by the technician using the TechNet home page.

Next, the user may wish to access the company intranet 280. Having logged-on to systems interface 210 (e.g., to establish a TechNet session), the user launches a shared network software application. Preferably, this shared network software application is a browser application. The user may or may not minimize the client application, but the user remains logged-on to systems interface 210 (i.e., the user does not close out or end the client application). As the browser launches and seeks out separate network address corresponding to the intranet site, systems interface 210 receives a message from computer 200 or otherwise detects that computer 200 is seeking access to intranet 280. The user may manually supply the separate network address. Alternatively, the separate network address may be previously stored on computer 200. For example, the separate network address can be set as the default home page for the browser or otherwise bookmarked.

In response to detecting that computer 200 seeks access to intranet 280, systems interface 210 determines whether intranet access is to be granted. For example, transaction servers 250 may confirm that the technician is a valid user who is properly logged-in to a TechNet session. Transaction servers 250 may compare the technician's user ID to a list of authorized (or prohibited) technician intranet users to determine if access to intranet 280 should be granted (or denied).

If access is granted, the systems interface 210 routes computer 200 to the separate network address corresponding to intranet 280. The middleware passes the session (the requested data transaction) on the network address that is input with TechNet, and the network address of the TechNet server is transmitted. Other network addresses sent by the browser are passed by the middleware. For example, in an embodiment where the systems interface 210 comprises protocol servers 240 and transaction servers 250 (FIG. 2), transaction servers 250 direct protocol servers 240 to route computer 200 from the first network address for protocol servers 240 to the separate network address for intranet 280. This routing permits computer 200 to leave the zone defined by firewall 260 for the systems interface and enter the zone defined by a firewall (not shown) for the intranet 280.

The firewall designates the allowable network destinations for incoming messages. The firewall has administrator-defined tables that lists acceptable destinations. Thus, specific locations or zones can be excluded. Intranet only access may be specified if the administrator so desires, and internet access can be excluded. The protocol server pass the incoming session along to the network address specified in the "header" of the incoming session. In this embodiment, transaction servers 250 send protocol servers 240 a message or command to effectuate this routing. Note that on incoming messages, transaction servers 250 are not involved if the incoming message requests a network address other than that of the transaction servers 250. Transaction servers 250 do not effectuate the routing, protocol servers 240 do. Only on outgoing messages that transaction servers 250 send header information to protocol servers 240 (common user I.D.) that informs protocol servers 240 to whom the return message should be sent. According to an embodiment, the separate network address corresponds to a so-called "Technician Intranet Access Home Page."

According to a first embodiment, the Technician Intranet Access Home Page is a so-called "focused" web page on intranet 280. The user can view this focussed web page, which is updated on a regular basis by a web page administrator. The user may be able to submit queries from this web page. However, the user is not permitted to leave this web page to go to other sites in intranet 280.

In a second embodiment, the Technician Intranet Access Home Page is an introductory page that the user can leave to visit other sites on intranet 280. In this embodiment, the home page preferably includes links to other sites on the intranet that the user might wish to visit.

At this point, the technician using computer 200 has access to local information on intranet 280. The aforementioned client application (e.g., the TechNet client application) is still active and the user is still logged-in to systems interface 210 (e.g., TechNet system). Preferably, the client application is minimized or its window is hidden behind the browser window. For example, the TechNet home page may be hidden behind the Technician Intranet Access Home Page. Preferably, the user can toggle between the two applications (or windows) because both are active. The technician can return to the systems interface (e.g., TechNet) by closing the browser or simply toggling between the two applications.

According to an embodiment, intranet 280 is a telephone company intranet serving various local offices of the telephone company. In this embodiment, the technician can access district-specific information such as cross-box locations, pricing information, service information, cable records, plat information, or other local information.

Figure 3:
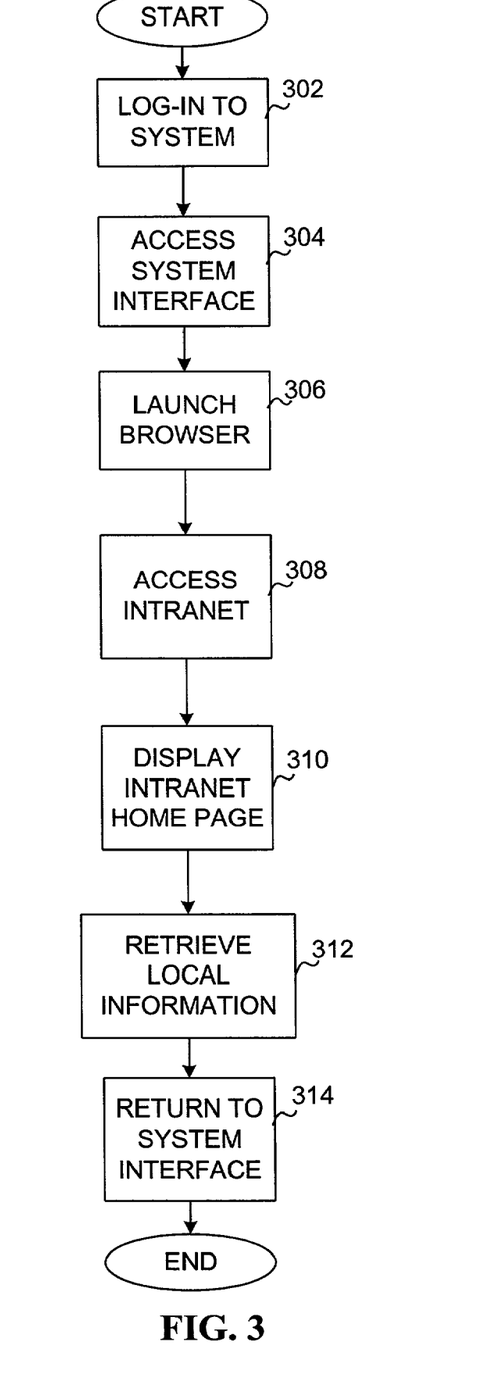
FIG. 3 is a flow diagram of a method for a user to access an intranet according to one embodiment of the invention.

FIG. 3 is a flow diagram of a method for a user (e.g., a technician) to access an intranet according to an embodiment of the invention. FIG. 3 is explained below in connection with certain structure from the exemplary systems of FIG. 1 and FIG. 2. This is done in order to explain and illustrate the invention in a clear manner. However, the method is not limited or constrained by the structure of FIG. 1 or FIG. 2 or by any other structure.

In FIG. 3, a user, such as a technician, logs-on to the system (e.g., the TechNet system) in step 302. For example, a technician may log-on to a protocol server 240 of FIG. 2 by entering a user ID. The log-on may occur over a wireline network or over a wireless network.

In step 304, the technician's computer (e.g., computer 200 of FIG. 2) accesses the systems interface (e.g., element 130 of FIG. 1 or element 210 of FIG. 2) to back-end legacy systems (e.g., element 140 of FIG. 1 or element 270 of FIG. 2). According to an embodiment, the systems interface is accessed at a first network address, preferably corresponding to a protocol server 240 (FIG. 2). The network address is preferrably an IP address.

In step 306, a shared network software application such as a browser is launched at the user's computer (e.g. computer 200 of FIG. 2).

In step 308, the user's computer accesses the intranet. In one embodiment, the user's computer accesses the intranet at a separate network address that is distinct from the aforementioned first network address. The separate network address is also preferably an IP address.

In step 310, an intranet home page is displayed. For example, a technician's computer 200 (FIG. 2) may display a Technician Intranet Home Page, previously discussed.

In step 312, the desired local information on the intranet (e.g., intranet 280 of FIG. 2) is retrieved. In one embodiment, a technician retrieves district-specific information such as cross-box locations, pricing information, service information, cable records, and plat information.

In step 314, the user returns to the systems interface to the legacy systems. For example, the user may toggle back to the TechNet client application or the user may close the browser application.

Figure 4:
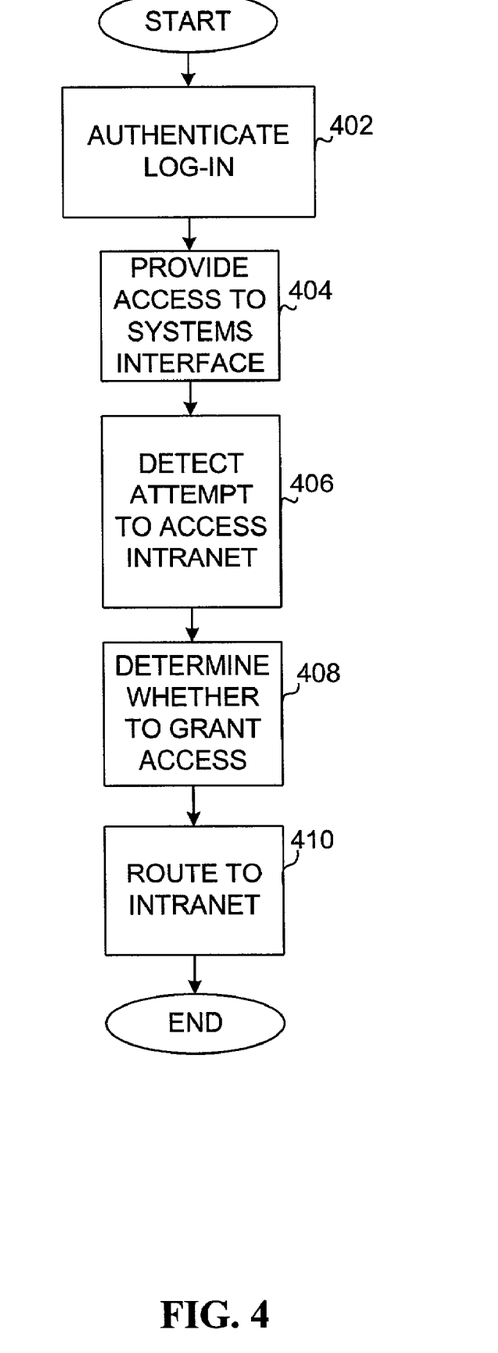
FIG. 4 is a flow diagram of a method for allowing a user to access an intranet according to another embodiment of the invention.

FIG. 4 is a flow diagram of a method for allowing a user (e.g., a technician) to access an intranet according to another embodiment of the invention. FIG. 4 is explained below in connection with certain structure from the exemplary systems of FIG. 1 and FIG. 2. This is done in order to clearly explain the method, and it should not be construed that the method is limited or constrained by the structure of FIG. 1 or FIG. 2 or by any other structure.

In step 402, a log-in attempt by a user is authenticated. For example, a protocol server 240 (FIG. 2) may authenticate a technician attempting a log-in using computer 200 (FIG. 2). The log-in attempt may occur over a wireline network or over a wireless network.

In step 404, access to a systems interface to back-end legacy systems is provided. For example, computer 200 may be accessing protocol server 240 (FIG. 2) at a first network address.

In step 406, an attempt by the user to access an intranet is detected. For example, protocol server 240 (FIG. 2) may receive a message generated by computer 200 requesting intranet access. Protocol server 240 may detect that computer 200 is seeking a network address corresponding to intranet 280 (FIG. 2). Protocol server 240 could detect that the user is attempting to access the intranet in other fashions. The middleware in protocol server 240 hands off the TechNet transaction to the TechNet server. All other network addresses are sent to Intranet 280. Thus, if browser is started and nonTechNet network addresses is requested, protocol servers 240 hand that session off to Intranet 280.

It is noted that in one embodiment of the present invention, transaction server 250 can comprise two components. The first component, e.g., a Sun E-10000 system, performs a database administration function that authenticates users according to data within the database that includes, for example, user ID, password, and PC serial number. The second component takes transaction requests from the user and, according to data in database, goes to the correct operations support system to effect the transaction. Protocol servers 240 pass the transaction on to the network address which is the header of the transaction.

In step 408, it is determined whether to grant access to the intranet. For example, transaction server 250 (FIG. 2) may determine whether a technician is logged-in to the TechNet system and/or whether that technician is permitted access to intranet 280 (FIG. 2). Access to the Intranet is provided by a firewall-access in or out of the protected zone is controlled by the firewall.

In step 410, the user is routed to the intranet. For example, communications from computer 200 (FIG. 2) may be routed from the first network address corresponding to the protocol server 240 (FIG. 2) to a separate network address corresponding to intranet 280 (FIG. 2). Preferably, the separate network address corresponds to a Technician Intranet home page, discussed above. In preferred embodiments, the network addresses are IP addresses.

The foregoing disclosure of the preferred embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for permitting a user to access data on a legacy system and an intranet, comprising:
   a systems interface coupled to the legacy system,
   wherein the systems interface comprises at least one network address that can be accessed by a computer,
   wherein the systems interface comprises a first server for managing protocol regarding the computer interfacing with a second server for generating transactions regarding the legacy system, wherein the first server is in direct communication with the intranet,
   wherein the systems interface is adapted to direct communications from the computer from the at least one network address to a separate network address corresponding to the intranet that is distinct from the legacy system upon detecting that the user has launched a browser on the computer by the first server for managing protocol bypassing the second server by directing the communications from the computer directly to the intranet, wherein the communications from the computer are directed from the systems interface to the intranet by the second server sending a command to the first server to direct the computer to the separate network address by bypassing the second server, wherein in response to detecting that the user has launched a browser, the system interface determines whether to grant access to the intranet by comparing, at the second server, a user ID used to logon to the first server to a list of authorized intranet users; and wherein further, the computer is in communication with both the at least one network address and the separate network address such that communication with the legacy systems and the intranet is maintained concurrently.

2. The system of claim 1, wherein the computer communicates with the systems interface over a wireline communications network.

3. The system of claim 1, wherein the computer communicates with the systems interface over a wireless communications network.

4. The system of claim 1, wherein the at least one network address, comprises a first IP address corresponding to the first server and a second IP address corresponding to the second server, and wherein the separate network address comprises a third IP address.

5. The system of claim 1, wherein the systems interface detects that the user has launched a browser by receiving a message from the computer.

6. The system of claim 1, wherein the systems interface detects that the user has launched a browser by receiving a request to transfer to the separate network address corresponding to the intranet.

7. The system of claim 1, wherein the computer is running application-specific client software to enable the computer to access the data from the legacy system, wherein the computer is logged onto the systems interface using the application-specific client software, and wherein, following the directing, the computer remains logged onto the systems interface and the application-specific client software remains an active application.

8. A system for permitting a user to access data, comprising:
 a computer operable by the user to access information from a legacy system; and
 means for providing an interface between the computer and the legacy system, the means having at least a first network address, the means including at least one protocol server that provides an interface to at least one transaction server that is in direct communication with the legacy system, wherein the at least one protocol server is in direct communication with the intranet;
 wherein the means for providing an interface is adapted to direct communications from the computer from the first network address to a second network address providing access to an intranet, that is distinct from the legacy system in response to the user launching a browser by the protocol server bypassing the transaction server by directing the communications from the computer-directly to the intranet, wherein the communications from the computer are directed from the means for providing an interface to the intranet by the transaction server sending a command to the protocol server to direct the computer to the second network address by bypassing the transaction server and wherein further, the computer is in communication with both the first network address and the second network address such that communication with the legacy systems and the intranet is maintained concurrently, wherein the means for providing an interface determines whether to deny access to the intranet by comparing, at the at least one transaction server, a user ID used to logon to the protocol server to a list of prohibited intranet users.

9. The system of claim 8, wherein the computer communicates with the means for providing an interface over a wireline communications network.

10. The system of claim 8, wherein the computer communicates with the means for providing an interface over a wireless communications network.

11. The system of claim 8, wherein the at least one protocol server provides an interface between the computer and the at least one transaction server, and wherein the at least one transaction server receives requests and generates legacy system transactions.

12. The system of claim 11, wherein the means for providing an interface issues at least one command in response to detecting that the user has launched the browser, wherein the at least one command causes the at least one protocol server to direct communications from the computer from the first network address to the second network address.

13. A method for accessing data, comprising:
 logging a computer onto a systems interface that permits remote access of legacy data of a legacy system, the systems interface including a protocol server that provides an interface to a transaction server that is in direct communication with the legacy system, wherein the protocol server is in direct communication with an intranet;
 accessing the systems interface at a first network address;
 launching a browser, wherein the browser is launched by a user of the computer; and
 accessing the intranet, wherein the intranet is distinct from the legacy system, at a separate network address by the protocol server bypassing the transaction server by directing communications directly to the intranet upon detecting the user launching a browser, wherein the communications are directed from the systems interface by the transaction server sending a command to the protocol server to direct the computer to the separate network address by bypassing the transaction server, wherein in response to detecting the user launching a browser, determining whether to grant access to the intranet by comparing, at the transaction server, a user ID used to logon to the protocol server to a list of authorized intranet users and
 wherein further, the computer is in communication with both the first network address and the separate network address such that communication with the legacy systems and the intranet is maintained concurrently.

14. The method of claim 13, wherein the computer is logged onto the systems interface over a wireline communications network.

15. The method of claim 13, wherein the computer is logged onto the systems interface over a wireless communications network.

16. A method for permitting a user to access data, comprising:
 authenticating a computer attempting to log onto a systems interface to legacy systems;
 providing access to the systems interface, the systems interface corresponding to at least one network address and including a protocol server providing an interface to a transaction server that is in direct communication with the legacy systems, wherein the protocol server is in direct communication with an intranet;

detecting an attempt to access the intranet, wherein the intranet is distinct from the legacy systems, wherein the attempt comprises a user launching a browser;

determining whether to deny the computer access to the intranet by comparing, at the transaction server, a user ID used to logon to the protocol server to a list of prohibited intranet users;

directing communications from the computer from the systems interface to a separate network address corresponding to the intranet by the protocol server bypassing the transaction server by directing communications directly to the intranet, wherein the communications from the computer are directed from the systems interface to the intranet by the transaction server sending a command to the protocol server to direct the computer to the separate network address by bypassing the transaction server; and communicating with both the at least one network address and the separate network address such that communication with the legacy systems and the intranet is maintained concurrently.

17. The method of claim 16, wherein the systems interface comprises a first server having a first network address and a second server having a second network address, wherein the first server provides a protocol interface between the computer and the second server, and wherein the second server processes requests and generates legacy transactions.

18. The method of claim 16, wherein the step of determining comprises confirming that a user of the computer is logged into the systems interface.

19. A system for permitting a user to access data by employing a computer to access information from legacy systems, wherein the computer executes application-specific client software to access the information from legacy systems, wherein the computer includes a browser that can be launched by the user to initiate an attempt to access an intranet at a separate network address, the system comprising:

a systems interface to the legacy systems, the systems interface including a protocol server and a transaction server, the protocol server having a first network address and the transaction server having a separate network address, wherein the protocol server is adapted to determine whether to grant the user access to the intranet that is distinct from the legacy systems in response to detecting that the user has launched the browser, and wherein the protocol server is capable of issuing at least one message to cause communications from the computer to be routed from the first network address to the separate network address by bypassing the transaction server at the second network address when access is granted, wherein the communications from the computer are directed from the systems interface to the intranet by the transaction server sending a command to the protocol server to direct the computer to the separate network address by bypassing the transaction server, and wherein the application-specific client software remains an active application after access to the intranet is granted, wherein the protocol server is in direct communication with the intranet.

\* \* \* \* \*